United States Patent

[11] 3,615,334

| [72] | Inventors | Jack Lawrenson<br>St. Helena;<br>Edward Morrison, Prescot, both of England |
|---|---|---|
| [21] | Appl. No. | 795,240 |
| [22] | Filed | Jan. 30, 1969 |
| [45] | Patented | Oct. 26, 1971 |
| [73] | Assignee | Pilkington Brothers Limited<br>Liverpool, England |
| [32] | Priority | Feb. 19, 1968 |
| [33] | | Great Britain |
| [31] | | 8021/68 |

[54] FLOAT GLASS APPARATUS WITH ADJUSTABLE SURFACE MODIFICATION MEANS
5 Claims, 4 Drawing Figs.

[52] U.S. Cl...................................................... 65/182 R,
65/30, 65/99 A
[51] Int. Cl....................................................... C03b 18/02
[50] Field of Search........................................... 65/60, 99, 182, 30

[56] References Cited
UNITED STATES PATENTS
1,447,647  3/1923  Crowley et al................  65/182
3,467,508  9/1969  Loukes.........................  65/99

Primary Examiner—S. Leon Bashore
Assistant Examiner—J. B. Hardaway
Attorney—Morrison, Kennedy & Campbell ABSTRACT: Surface treatment of heated glass is effected by locating a body of molten material in contact with a glass surface to be treated. The molten body clings to an elongated locating member supported by a plurality of support members which are adjustable to maintain the locating member linear.

PATENTED OCT 26 1971

Inventors
Jack Lawrenson and Edward Rozoson
By
Morrison Kennedy & Campbell
Attorneys 3,615,334

FLOAT GLASS APPARATUS WITH ADJUSTABLE SURFACE MODIFICATION MEANS

BACKGROUND OF THE INVENTION

This invention relates to the manufacture of glass, and more particularly to the surface treatment of glass.

It has been proposed to impart desired surface characteristics to glass by maintaining a body of molten material which modifies the glass in contact with a surface of the glass, the latter being heated or in a semimolten state during manufacture and being advanced past the body of molten material as a continuous ribbon.

Surface modification of the glass is caused by migration of an element from the molten material into the surface of the glass, and the modification may be controlled by regulating the oxidation conditions at the interface between the molten material and the glass or by passing a controlled electric current between the body of molten material and the glass.

The body of molten material in contact with the glass is maintained in a desired location by means of a locating member, usually in the form of an elongated bar extending horizontally across the glass ribbon, to which the molten material clings by a wetting action.

In use such a locating member has an elevated working temperature, being disposed close to the surface of the heated glass, and the member is supported at each end outwardly of the glass undergoing treatment. Some degree of sagging of the center of the locating member relative to its ends necessarily occurs due to the weight of the member, and this leads to an undesirable variation in the spacing between the locating member and the surface of the glass, causing inhomogeneity in the surface modification imparted to the glass at different positions along the locating member.

One of the objects of this invention is to provide an improved apparatus in which the tendency of the locating member, or the supporting means therefor, to sag under its own weight can be counteracted.

SUMMARY

According to the invention apparatus for use in effecting surface treatment of heated glass includes an elongated locating member against which a body of molten material may be maintained by wetting contact, said molten material in use of the apparatus, being in contact with a surface of the glass to be treated, and said locating member being supported from a horizontal beam structure by a plurality of support members spaced apart along the length of the beam structure, and means for adjusting at least one of the support members vertically so as to compensate for natural flexion of the beam structure and to maintain the locating member linear, or in conformity with a predetermined shape.

Preferably vertically adjustable beam supports are provided at each end of the beam structure outwardly of the locating member. The beam supports may be adjustable independently to raise or lower the beam structure as required, for example to "take up" wear of the locating member.

A further object of the invention is to provide a mounting arrangement for the locating member which avoids thermal distortion of the locating member. Preferably, therefore, the locating member is held in an elongated holder which is supported by said support members with freedom of longitudinal movement under thermal expansion. The holder preferably has longitudinally extending slots into which respective enlarged heads of said support members fit with freedom of movement longitudinally relative to the holder.

In a preferred embodiment the means for adjusting the support members are effective to move the center portion of the locating member vertically relative to the longitudinal ends of the said member, and are operable from a position or positions located outwardly of the said ends of the member. The means for adjusting the or each adjustable support member may include a vertical screw device connected to one of the support members and operable by means of a mechanical drive transmission from one end of the horizontal beam structure.

Vertical adjustment of each beam support may be effected independently by means of a respective screwjack. Fluid pressure actuator means may be associated with each beam support for effecting rapid raising and lowering of the beam structure independently of the adjustable beam supports. This enables the beam to be raised rapidly in an emergency, for example if a large stone should be present in the glass.

It is preferred to provide the beam structure with at least one longitudinally extending coolant channel for the flow of coolant fluid, for example, water.

Means are preferably provided for enabling the beam structure to be rotated about its axis. Thus the beam structure may be supported at each end in bearings which permit rotation of the beam structure about its longitudinal axis. This facilitates assembly of the apparatus. Moreover, this facility may be employed to adjust the setting of the locating member to maintain the wetted surface thereof parallel to the surface of the glass as wear of the member takes place. Rotation of the beam about its axis may also be employed to remove the locating member from its operative position in an emergency.

Surface treatment of glass with apparatus according to the invention is preferably assisted by the passage of an electric current through the body of molten material which clings to the locating member in use of the apparatus and through the glass surface with which said body is in contact. For this purpose the locating member and said body of molten material are preferably electrically conductive, and an electrical connection is provided to the locating member for the passage of current through said body. In this preferred embodiment the body of molten material serves as an electrode in an electrolytic circuit including the glass an an effective electrolyte.

Where the apparatus according to the invention is for use in the manufacture of flat glass having desired surface characteristics the apparatus may further comprise a support for an advancing ribbon of glass, heaters associated with the support for thermally conditioning the advancing glass, and means for supplying molten material to said locating member to form a body of molten material clinging to the locating member and extending across the advancing glass ribbon.

DESCRIPTION OF THE PREFERRED EMBODIMENT

Figure 1:
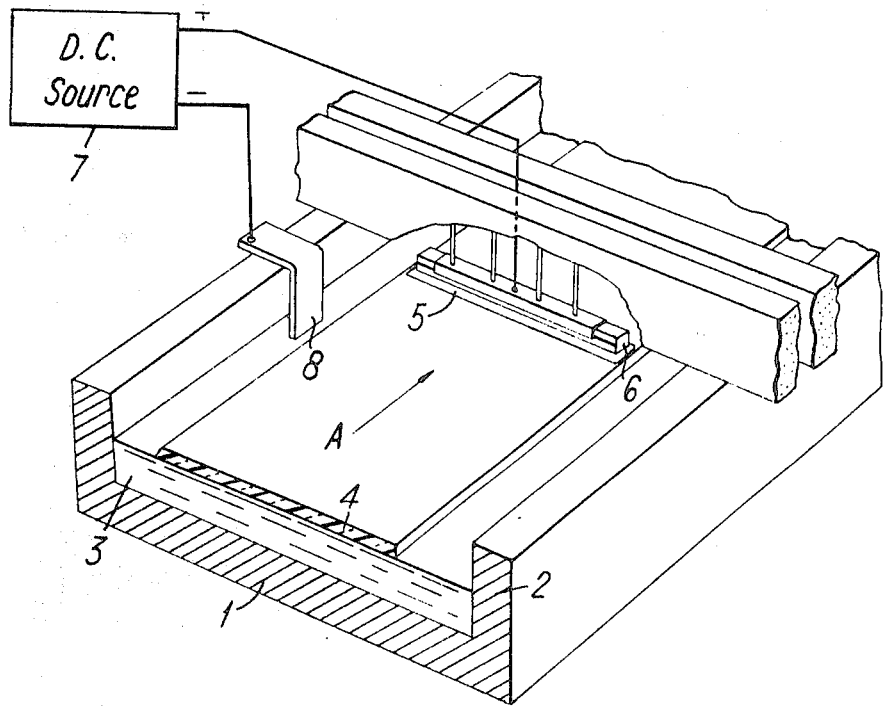
FIG. 1 is a partially broken-away diagrammatic perspective view of part of an apparatus for effecting surface treatment of a heated glass ribbon according to a preferred embodiment of the invention.

Referring to FIG. 1 there is shown part of a tank structure having a floor 1 and integral sidewalls 2. The tank structure contains a bath of molten metal 3, preferably tin or an alloy in which tin predominates. A roof structure, not shown in the interests of clarity, defines a headspace over the molten metal bath in which a protective atmosphere is maintained.

Glass, for example soda-lime-silica glass, is fed to the bath of molten metal 3 at a controlled rate, either as a preformed ribbon of glass, or as molten glass which is poured on to the bath 3 of molten metal at a controlled rate and which is permitted to flow laterally unhindered to the limit of its free flow to form a ribbon of glass 4. The glass ribbon 4 is advanced over the surface of the bath 3 in the direction of arrow A. The temperature of the glass ribbon 4 is regulated as it is advanced by means of controlled heaters immersed in the bath 3 and located in the headspace over the bath 3. These heaters are omitted from the drawings in the interests of clarity.

In order to impart desired surface characteristics to the upper face of the advancing ribbon of glass 4 a body of molten material 5 is maintained in contact with the upper face of the glass at a fixed station, the body 5 extending transversely across the glass ribbon 4. The molten body 5 is maintained in position by an elongated locating member 6 extending transversely across the ribbon 4 parallel to the upper face thereof so that a gap, for example of about 7 mm., is maintained between the lower surface of the member 6 and the upper face of the ribbon 4. The gap may be reduced to about 4 mm.

The body of molten material 5 wets the lower surface of the locating member 6 and clings thereto, so that the body 5 is confined between the lower surface of the member 6 and the upper face of the advancing ribbon 4, so that in effect the ribbon 4 passes continuously beneath the molten body 5. The clinging of the body 5 to the member 6 at least partly relieves the weight of the body 5 acting on the semimolten glass ribbon 4, and prevents the body falling through the ribbon, as well as preventing movement of the body 5 with the glass ribbon 4.

The molten material of the body 5 may be a molten metal or alloy. For example, the material may be tin, lead, bismuth, antimony, indium, zinc, or thallium. Examples of suitable molten alloys are alloys of tin or lead or bismuth as a solvent metal with lithium, sodium, potassium, zinc, magnesium copper or silver as a solute metal. The locating member 6 is preferably of an unreactive metal, for example one of the platinum group metals. Alternatively, the member 6 may comprise a base of, for example, copper, silver, brass, steel, alloys containing copper, alloys containing silver, or a refractory material, having a coating of an unreactive metal, for example, ruthenium.

As the glass ribbon 4 passes beneath the molten body 5 its surface is modified by an element of the body 5 which migrates into the glass. The migration is preferably controlled by passing an electric current through the body of molten material 5 and the glass ribbon 4. For this purpose the locating member 6 should be electrically conductive and is connected to a direct current electrical supply so that the molten body 5 acts as an anode and the molten metal bath 3 as a cathode of an electrolytic circuit. As illustrated diagrammatically in FIG. 1, a positive terminal of a direct current source 7 is connected to the locating member 6 and a negative terminal of said source to an electrode 8 immersed in the molten metal bath 3.

The surface modification of the glass ribbon 4 may alternatively be regulated by controlling oxidizing conditions in the body of molten material 5 so as to control the migration of an element from the body 5 into the glass surface.

A supply duct (not shown) is provided adjacent the member 5 for replenishing the body 5 of molten material with the element which migrates into the upper surface of the glass ribbon 4 in operation of the apparatus.

In order to ensure uniform surface treatment of the glass ribbon 4 across its width it is important to ensure that there is no variation in the size of the gap between the lower surface of the locating member 6 and the upper face of the glass across the width of the ribbon 4. With this object in view the locating member 6 is supported from a beam structure 10 extending transversely through the headspace above the molten metal bath 3 by a supporting arrangement illustrated in FIGS. 2–4. The beam structure 10 is shown partially broken-away in FIG. 1 for the sake of clarity.

Figure 3:
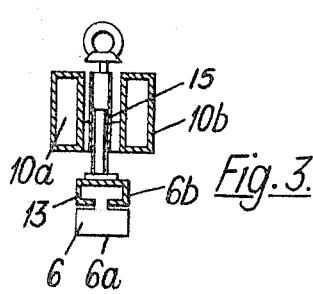
FIG. 3 is a cross section on the line III—III of FIG. 2.
Figure 4:
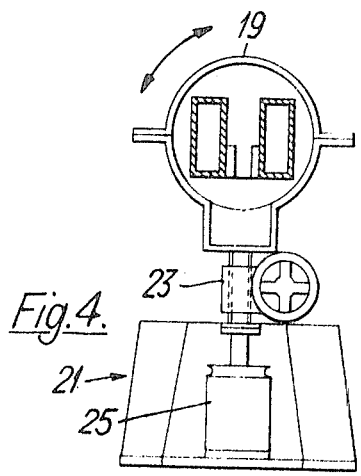
FIG. 4 is a cross section on the line IV—IV of FIG. 2.
Figure 2:
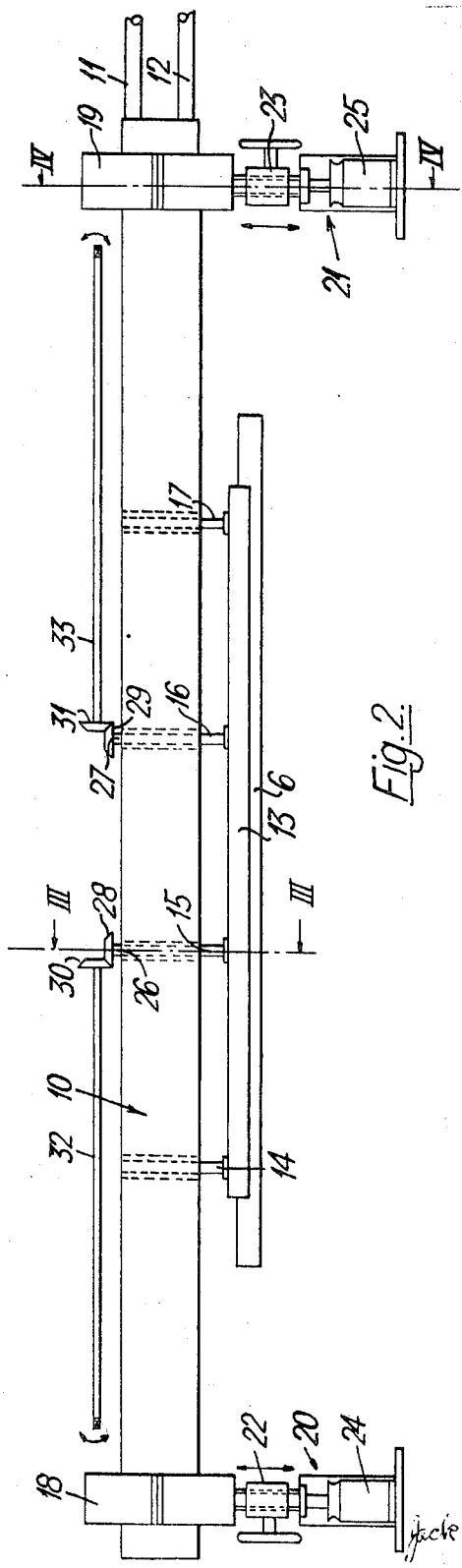
FIG. 2 is a diagrammatic elevation in the direction of arrow A of part of the apparatus shown in FIG. 1.

Referring to FIGS. 2 and 3, the beam structure 10 comprises two parallel hollow beams 10a, 10b of rectangular section, each extending horizontally across the tank structure with its longer edge face disposed vertically (FIG. 3). The hollow interiors of the beams 10a, 10b form channels for the flow of a coolant fluid, conveniently water, circulated through the beams by way of ducts, 11, 12 at one end of the beam structure 10. The coolant flow maintains the beam structure 10 at a temperature which is considerably lower than the temperature of the molten body 5 and locating member 6, which temperature is typically of the order of 750° C.

The locating member 6 is in the form of an elongated bar having a flat elongated lower surface 6a (FIG. 3) against which the molten body 5 clings in use of the apparatus. To facilitate replacement of the member 6 when worn without removing the beam structure 10 the member 6 has an elongated key portion 6b along its upper surface. The key portion 6b is received with freedom of sliding movement in an elongated holder 13 having a partly closed channel section so that the locating member 6 is held thereby without constraint. That is to say, the member 6 is able to undergo thermal expansion relative to the holder 13 without deformation occurring.

The holder 13 is suspended from the beam structure 10 by four support members 14, 15, 16, 17 comprising respective vertically extending tee bolts, each of which has an enlarged T-shaped head which engages freely in longitudinal extending tee slots provided in the upper surface of the holder 13. The support member 15 is shown in detail in FIG. 3, and members 14, 16 and 17 are similarly connected to the beam structure 10a, 10b. The support members 14–17 are spaced at equal intervals along the holder 13, and the number and spacing of the members is so chosen that the gravitational deflection of the holder 13, and, therefore, of the locating member 6, between neighboring suspension points is less than an acceptable maximum. Since the holder 13 is suspended by the support members 14–17 with freedom of relative movement longitudinally, thermal expansion of the holder 13 and the locating member 6 can take place without constraint. Thus buckling of the locating member 6 under its working conditions is avoided.

The beam structure 10 is supported at each end outwardly of the sidewalls 2 of the tank structure in respective horizontal split bearings 18, 19 so that the beam structure 10 can be rotated about its longitudinal axis. Each bearing 18, 19 is supported on a vertically adjustable beam support pedestal 20, 21.

Finely adjustable screwjacks 22, 23 are incorporated in each beam support pedestal 20, 21. By adjusting the screwjacks 22, 23 independently the height of the beam structure 10 above the molten metal bath 3 can be adjusted so as to maintain a predetermined gap between the locating member 6 and the upper face of the glass ribbon 4. Adjustment of the jacks 22, 23 is effected to "take up" wear of the locating member 6 in use of the apparatus.

Each beam support pedestal 20, 21 further incorporates a respective pneumatically operated ram 24, 25 the pistons of which extend coaxially within the bores of the respective screwjacks 22, 23. A pneumatic control system (not shown) is provided for operating the two rams 24, 25 in unison when it is required to raise the beam structure 10 in an emergency, for example to avoid damage to the locating member 6 should a large stone be present in the surface of the glass ribbon 4.

The beam structure 10 will undergo a natural flexion between the two support pedestals 20, 21 due to its own weight, and provision is made for adjusting the supporting tee bolts 14–17 so as to compensate for this flexion and to maintain the holder 13 and the locating member 6 in a desired configuration (in this case linear). In the illustrated embodiment the two inner support members 15, 16 are extendable vertically by means of respective screw devices. Each of the tee bolts comprising the support members 15, 16 has a screw-thread connection to a respective vertically extending adjusting shaft 26, 27 carrying a bevel gear 28, 29 at its upper end. The bevel gears 28, 29 mesh with respective bevel gears 30, 31 on respective horizontal shafts 32, 33 extending along the upper surface of the beam structure 10 to opposite respective ends thereof. Adjustment of the support members 15, 16 vertically is effected by rotating the shafts 32, 33, for example by means of suitable handwheels or cranks located outwardly of the ends of the beam structure 10, and therefore externally of the tank structure.

In this way the holder 13 (and locating member 6) may be flexed about its two end support members 14, 17 and maintained tangential to line of curvature of the beam structure 10 at the center thereof. Similarly, if the glass ribbon 4 were supported on a curved surface, for example, when manufacturing curved glass sheet of a desired shape, the support members 14–17 could be adjusted relatively to each other to maintain the elongated surface 6a of the locating member 6 in conformity with the desired shape in a vertical plane of the ribbon, notwithstanding the natural flexion of the beam structure 10.

The supporting arrangement for the locating member 6 is also applicable where the locating member 6 is supported from a beam structure disposed beneath a glass surface requiring treatment, that is, where the locating member maintains a body of molten material in contact with a lower face of a glass ribbon.

Should the lower surface 6a of the locating member 6 become worn and therefore not parallel to the glass ribbon 4 in the direction of advance thereof, a compensating connection can be made by rotating the beam structure 10 about its axis to maintain said surface parallel to the glass ribbon 4. Rotation of the beam structure 10 about its axis is also effected when it is desired to displace the locating member 6 from its operative position (FIG. 3) into an inoperative or retracted position, in which the beam structure 10 is rotated through 90° from the position shown in FIG. 3, to facilitate replacement of the locating member 6 when worn. Rapid rotation of the beam structure 10 into this inoperative position also permits rapid emergency displacement of the locating member 6 from its operative position so that the locating member may be made to clear an obstacle such as a stone in the ribbon 4.

In order to set up the apparatus initially the beam structure 10 and the holder 13, with the locating member 6 removed, is set up, in the cold condition, between supports spaced apart by the same distance as the pedestals 20, 21, and the beam structure allowed to take up its natural sag. The holder 13 is then adjusted while cold until it is accurately straight and true, this being tested by inserting a new locating member 6. The cold adjustment being then complete, the locating member 6 is removed and the beam structure 10 and holder 13 are inserted through the sidewalls 2 of the tank structure in the inoperative position, and set up between the support pedestals 20, 21 so that the assembly is introduced into the relatively narrow headspace above the molten metal bath 3 with little possibility of damage to the holder 13. When located correctly in the bath headspace the beam structure 10 is rotated into its operative position, and the locating member 6 is slid into position in the holder 13 through the opening of one of the bearings 18, 19 and the assembly then lowered to bring the surface 6a into juxtaposition to the surface of the bath 3.

As the molten body 5 is built up between the surface 6a and the bath surface some further deformation of the locating member 6 may occur due to the heating of the surface 6a, in which event further adjustment of the member 6 is effected by means of the adjustable support members 15, 16 until the surface 6a is again accurately straight and true. Such further deformation is unlikely to be large, however, as the vertical temperature gradient close to the bath surface is slight and the vertical depth of the member 6 is small.

Since the member 6 is free from end constraint in the holder 13 it is free to take up the shape of the holder, this shape being straight in the illustrated embodiment.

The adjustable locating member support means described herein may also be used to control, as required, the dimensions of the body 5 of molten material and thereby control the surface modification of a ribbon of glass.

We claim:

1. Float glass manufacturing apparatus comprising a tank structure containing a bath of molten metal along which a ribbon of float glass is advanced, a horizontal beam structure mounted across the tank structure, an elongated locating member of an electrically conductive material to which there clings a body of molten electrically conductive material for modifying the glass, which locating member is suspended from the beam structure by a plurality of support bolts spaced apart along the length of the beam structure and is thereby positioned adjacent to but spaced from the glass, means for vertically adjusting at least one of said support bolts independently of other support bolts to compensate for flexion of the beam and thereby maintain uniformity of spacing between the locating member and the glass surface, and electrical connection means connected to the locating member and the molten metal bath.

2. Apparatus according to claim 1, wherein the locating member is held in an elongated holder which is supported by said support bolts with freedom of longitudinal movement under thermal expansion.

3. Apparatus according to claim 2, wherein the holder has longitudinally extending slots into which respective enlarged heads of said support bolts fit with freedom of movement longitudinally relative to the holder.

4. Apparatus according to claim 1, wherein said one of said support bolts is located in the center portion of said locating member and the means for adjusting the support bolts include means for vertically adjusting said one of said support bolts relative to the longitudinal ends of said locating member, and wherein said means for vertically adjusting are operable from a position located outwardly of the said ends of said locating member.

5. Apparatus according to claim 4, wherein the means for vertically adjusting each adjustable support bolt include a vertical screw device which is connected to one of the support bolts and is operable by means of a mechanical drive transmission from one end of the horizontal beam structure.